United States Patent

[11] 3,628,563

[72] Inventor: Takehiko Tomita, Tokyo, Japan
[21] Appl. No.: 881,103
[22] Filed: Dec. 1, 1969
[45] Patented: Dec. 21, 1971
[73] Assignee: Tokyo Shibaura Electric Co., Ltd. Kawasaki-shi, Japan
[32] Priority: Dec. 10, 1968
[33] Japan
[31] 43/90067

[54] EXPLOSION DETECTING MEANS FOR A FLUID PIPELINE
8 Claims, 1 Drawing Fig.

[52] U.S. Cl. .................................................. 137/460, 137/487.5, 137/565
[51] Int. Cl. ...................................................... F16k 17/20
[50] Field of Search ........................................... 137/565, 459, 460, 486, 487.5; 417/9, 12, 18, 20, 26, 27, 28, 43

[56] References Cited
UNITED STATES PATENTS

| | | | |
|---|---|---|---|
| 3,369,561 | 2/1968 | Zimmerman et al. | 137/487.5 X |
| 3,454,037 | 7/1969 | Grace et al. | 137/487.5 |
| 3,464,438 | 9/1969 | Maurer | 137/487.5 |

Primary Examiner—William R. Cline
Attorney—Oblon, Fisher & Spivak

ABSTRACT: A device for detecting an increase in water flow through a water service main and for detecting the pressure drop existing in the water flowing through the main is disclosed. The device operates when the volume of the existing water flow in the main exceeds by a predetermined value a volume of water flow previously stored in a first memory device during a predetermined sampling period. The apparatus for detecting the pressure drop of the water in the water service main operates when the amplitude of the existing water pressure falls below the water pressure previously stored in a second memory device. The supply of water into the water service main is stopped by the simultaneous operation of both these detecting devices.

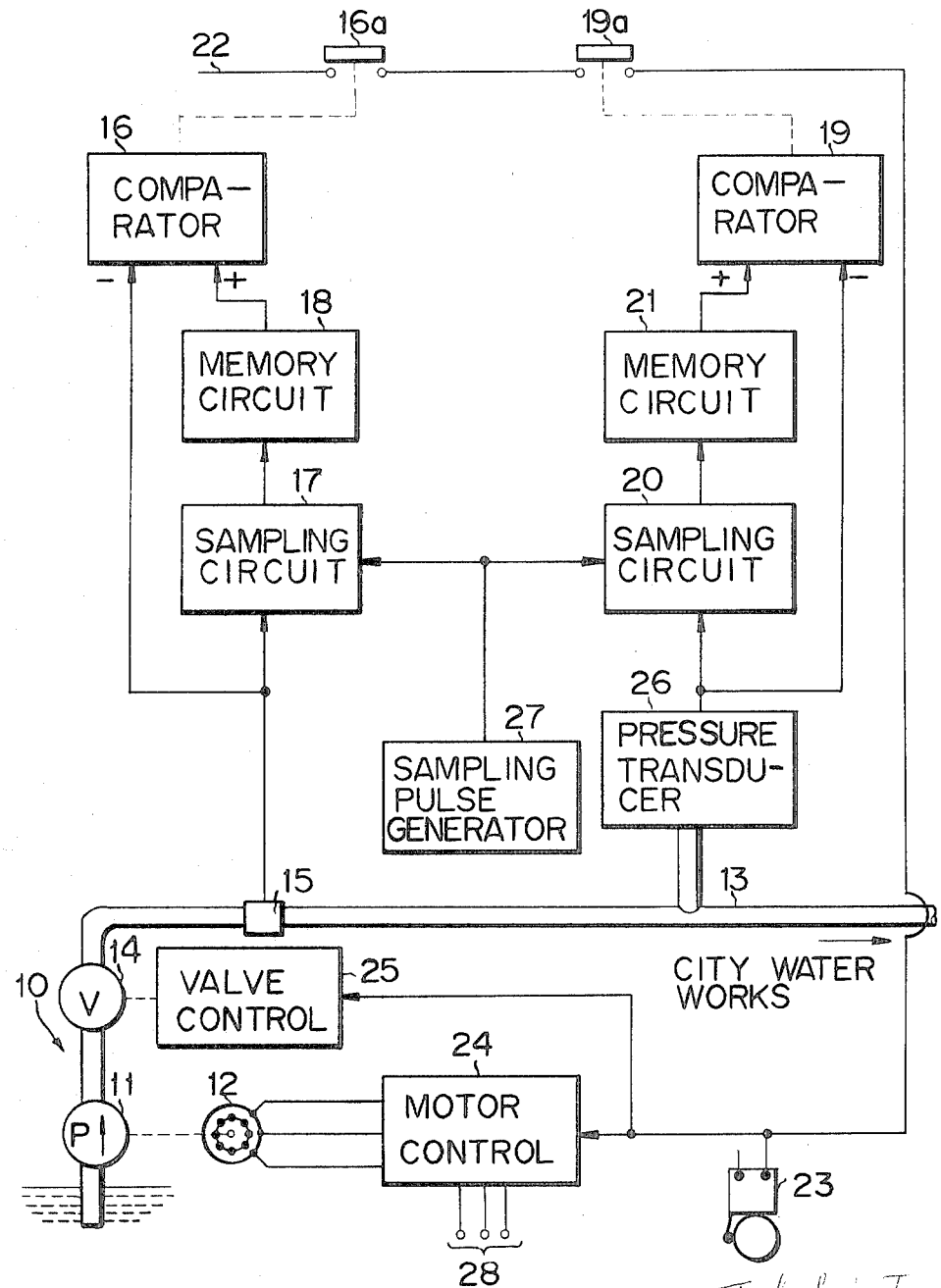

EXPLOSION DETECTING MEANS FOR A FLUID PIPELINE

BACKGROUND OF THE INVENTION

1. Field of the Invention

The present invention relates to explosion, or rupture detecting means for fluid pipe lines, and particularly to means for accurately detecting a rupture in a city water service main.

2. Description of the Prior Art

In a large city, there are frequently large construction projects for subways, roads, new buildings and the like during which water service mains buried beneath the earth may be ruptured by piles which are driven into the earth. Once such a rupture occurs, large areas of the city near the damaged portion of the water service main may be flooded or shut off from their water supply. Accordingly, it is important to provide means for rapidly detecting the rupturing of water mains to rapidly prevent the leakage of water therefrom.

For this purpose, there have been known two representative types of devices in the prior art, one of which detects a sudden increase of water flow in a water service main upon the occurrence of a rupture, and the other of which detects a sudden decrease of pressure in the ruptured main. The former, however, has a significant defect in the fact that it may respond to a momentary sudden increase of initial flow at the start of pumping. The latter devices require troublesome readjustments from time to time, with respect to their triggering threshold, because of the increase of passage resistance in the water service main which results from rust accumulating on the inner surface thereof for a long period.

SUMMARY OF THE INVENTION

It is therefore an object of this invention to provide improved explosion or rupture detecting means for water service mains which is not falsely triggered by a sudden increase of water flow in the water service main caused by pump starting, for example, and does not require extremely troublesome readjustments of its reference threshold for long term pressure drops.

Briefly, in accordance with one aspect of the present invention, there are provided a pair of transducers in a water service main, one of which functions to convert water flow in the water service main into first electrical signals and the other of which acts to convert pressure drops existing in the main into second electrical signals. The first electrical signals are directly fed to one input of a first comparator to suppress the operation thereof, and the same signals are fed to the other input of the same comparator with a time delay through a first sampling circuit and a first memory circuit to operate the comparator. The aforesaid time delay of the first signals depends upon the sampling periods of the first sampling circuit. Similarly, second electrical signals are directly fed to one input of second comparator and are also fed to the other input of the second comparator with a delay time through second sampling circuit and a second memory circuit to operate the second comparator. The delay time of the second signals depends on the sampling periods of the second sampling circuit. It is preferable that there is provided a common sampling signal generator for both sampling circuits to synchronize the output signals of the comparators. The output signals of the comparators are connected in series to form an AND gate thereby to cause a pump and/or a main valve for the water service main to stop and/or shut off.

BRIEF DESCRIPTION OF THE DRAWINGS

The single FIGURE is a block diagram illustrating the preferred embodiment of the present invention.

Referring now to the FIGURE, there is shown a pump set generally denoted by reference numeral 10 which comprises a pump 11 driven by an electrical motor 12. The pump 11 pumps stored water into a water service main 13 through a main stop valve 14. The end of the water service main 13 is connected to a water distributing network for a city.

To measure the water flow, there is provided a flowmeter 15 in the water service main, which may preferably be an electromagnetic flowmeter. Thus, electrical signals proportional to the water flow in the water service main are generated by the electromagnetic flowmeter. The flowmeter 15 is the first transducer described above. The water service main has also a second transducer 26 which acts to convert the water pressures in the main to appropriate electrical signals.

The electrical signals derived from the flowmeter are directly fed to one input of a comparator 16. The output signals of the flowmeter 15 are also fed to a sampling circuit 17 and then stored in a memory circuit 18 during every sampling period of the sampling circuit. The memory circuit 18 is cleared every sampling period and at the same time stores the successive sampling signals. These sampling signals are finally fed to the other input of the comparator 16 and compared with the direct signals at the comparator. Thus, it will be understood that the sampled signals lag by a sampling period of time defined by the sampling circuit 17. The comparator 16 generates an output signal only when the difference between the sampled signals and the direct signals increases to a predetermined value. Thus, it can be seen that the direct signals function as operating signals whereas the sampled ones function as suppressing signals. The output signals of the comparator 16 are employed to close a normally open contact 16a. Thus, in other words, the closing of the output contact 16a of the comparator 16 will occur only when the present flow existing in the water service main becomes larger by a predetermined value than the previously measured flow which had existed in the prior sampling period. Accordingly, for example, if the sampling period is selected as 1 minute, the closing of the contact 16a due to the normal open and closing operations of remote valves (not shown) located anywhere on the service main will not occur because these valves are opened and closed gradually over periods of 2 or 3 minutes. However, if the source pump 11 starts, the contact 16a may be closed erroneously because of a large increase in the rate of water flow.

This defect can be effectively eliminated by the following arrangements. As described above, the water service main 13 is provided with a second transducer 26 which acts to convert the pressure of water in the water service main to electrical signals. The electrical pressure signals are directly fed to an input of a second comparator 19 and are also fed to a sampling circuit 20, and then to an input of a memory circuit 21 wherein they are stored. The stored pressure signals are then fed to the other input of the comparator 19.

Since the operations of comparator 19, sampling circuit 20 and memory circuit 21 are identical to those as described in connection with the flow-measuring system, the detailed explanation thereof is omitted. The comparator 19 also has a normally open contact 19a connected in series with the aforesaid normally open contact 16a. The comparator 19 causes the contact 19a to close only when the amplitude of the pressure existing in the water service main becomes lower by a predetermined amount than the pressure amplitude stored in the memory circuit. Accordingly, when an explosion or rupture of the water service main occurs, the pressure signals which come directly into one input of the comparator will be reduced due to the rupture of the main. The sampled and stored pressure signals will then be greater than the directly received pressure signals so as to close the contact 19a. The contact 19a forms an AND gate with the contact 16a. It can be seen that it is difficult to satisfactorily provide a reliable system where only a pressure responsive device is provided because such a device can not distinguish a relatively rapid pressure drop due to a rapid increase in water demand from a pressure drop resulting from a rupture of the water service main. However, this defect is effectively eliminated in the present invention by the use of sampling periods which are short relative to the operating speeds of remote values.

One end 22 of the AND gate formed by the series connected contacts 16a and 19a is connected to one of the terminals of a control voltage source (not shown) and the other end thereof is connected to an alarm device 23, a control device 24 for an electric motor 12 and a control device 25 for a main valve 14.

Under normal operating conditions, the control device 24 is constructed in such a manner as to apply variable voltages to the electric motor 12 from a relatively constant AC voltage source 28, thereby controlling the pump speeds as desired. The control device 24 also includes an arrangement which acts to deenergize the motor when it receives an override signal through the series connected contacts 16a and 19a. The control 25 for the main valve 14 is constructed to the valve under normal operating conditions, but includes an arrangement to make the valve close when it receives an override signal through the series connected contacts 16a and 19a as described above.

There is also provided a sampling pulse generator 27 for generating a pulse train for controlling the sampling circuits 17 and 20 periodically and simultaneously. As described above, the pulse repetition rate of the pulse train may be selected to about one minute, which is shorter than the two or three minute period during which remote valves of the water service main would normally be operated.

The operation of the system will now be described in various circumstances. Assume first that the pump set 10 begins to perform the pumping-up operation and the main valve 14 is opened to pump the water into the water service main 13. The water flow and the pressure in the water service main gradually increase until they reach normal running values. The comparator 16 may operate to close the contact 16a thereof in response to the increased rate of water flow. However, the output contact 19a of the comparator 19 will not close, because the water pressure in the water service main is increasing during the starting period of the pump 11 whereby the amplitudes of pressure signals stored in the memory circuit 21 will exceed the present water pressure level existing in the water service main. Consequently, there is no chance that contacts 16a and 19a will be simultaneously closed erroneously by the starting of pump 11. In this way, the pumping system will reach its normal operating state.

During normal operation of the pumping system, the pumping set 10 operates at variable speeds through motor control 24 in response to the demand for water, as is well known in the art. Assume now that an increase of water demand has occurred with a relatively high rate of change, which may be due to the opening of a large remote valve located in the water service main in a remote area. There will then occur a pressure drop at a relatively high rate in the water service main in response to this increase in water demand. As described above, although these changes tend to close the contacts 16a and 19a, their rate of change is longer than the sampling period defined by the pulse train of the sampling pulse generator, and consequently the contacts 16a and 19a can not close to erroneously operate the alarm and the controls for the pump set and the main valve.

If an explosion or rupture occurs in the water service main, the water flow through the water service main will rapidly increase and at the same time the water pressure in the main will drop. It will be readily understood that the rate of change of these events falls within the sampling period of the sampling circuits 17 and 18. Thus in this case, if the existing water flow exceeds the amplitude stored in memory circuit 18 by a predetermined amount and at the same time the water pressure drops below the amplitude stored in memory circuit 19, both comparators 16 and 19 simultaneously cause the contacts 16a and 19a to close. An override signal is thus developed through both closed contacts 16a and 19a to the alarm 23 to announce the occurrence of the fault, and to the control 25 to shut off the main valve 14, as well as to the control 24 to stop the pump set 10. Thus, it is possible to rapidly stop the water supply to the water service main thereby causing the amount of water which leaks therefrom to be effectively reduced.

As described above, in accordance with this invention, it is possible to provide a rupture detecting means for accurately detecting an explosion or rupture of a city water service main, which has the following advantages. Firstly, since dead bands are provided in the response characteristics of both comparators 16 and 19, respectively, they do not operate erroneously, in response to the normal fluctuations in water flow and water pressure in the water service main. Secondly, when the pumping set starts causing a rapid increase in water flow, even though the first comparator 16 which responds to the increase of water flow may operate erroneously, the stop control of the pumping set is not activated because of the second comparator which responds only to decreased pressure in the water service main. Thirdly, it is possible to easily prevent the comparators from erroneous operation due to normal variations in water flow and water pressure which may occur during the opening and closing of remote valves because the sampling periods for both sampling circuits have been so selected that they are shorter than the opening and closing speeds of the remote valves. Lastly, because both sampling circuits are energized from a common sampling signal generator, and are operated in synchronism each other, there is no chance to simultaneously make both contacts close, and thus the rupture detection may be accurately effected.

It will be readily appreciated by those skilled in the art that both contacts 16a and 19a may be alternatively arranged as normally closed contacts connected in parallel to form an OR gate, thus causing the controls 24 and 25 to stop the pump set 10 and close the main valve 14 only when both contacts are simultaneously open. Though the contacts 16a and 19a have also been shown as mechanical switches, they may, of course, also be contactless or transistorized switches. Further, the spirit of the present invention may be adapted for detecting explosions or ruptures in pipe lines used in the petroleum industry or in any other types of pipelines.

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A system for detecting ruptures in a pipeline comprising:
   fluid flow responsive means coupled to said pipeline for generating signals proportional to the rate of fluid flow in said pipeline,
   first logic means coupled to said fluid flow responsive means for generating an output signal only if fluid flow in said pipeline is increasing at a rate greater than a predetermined rate,
   fluid pressure responsive means coupled to said pipeline for generating signals proportional to fluid pressure within said pipeline,
   second logic means coupled to said fluid pressure responsive means for generating an output signal only if pressure in said pipeline is decreasing at a rate greater than a predetermined rate; and,
   control means coupled to said first and second logic means for generating a control signal in response to the simultaneous presence of output signals from both said first and second logic means.

2. A system for detecting ruptures in a pipeline as in claim 1, further comprising:
   means coupled to said control means and to said pipeline for cutting off fluid flow in said pipeline in response to the generation of said control signal.

3. A system for detecting ruptures in a pipeline as in claim 1, wherein:
   said control means comprises an AND gate including two series connected switching means.

4. A system for detecting ruptures in a pipeline as in claim 1, further comprising:

alarm means coupled to said control means for producing an alarm signal in response to the generation of said control signal.

5. A system for detecting ruptures in a pipeline as in claim 1, wherein:
said first logic means comprises memory means coupled to said fluid flow responsive means for storing an output signal thereof for a predetermined interval; and,
comparator means coupled to said memory means and to said fluid flow responsive means for comparing said stored signal with another output signal from said fluid flow responsive means.

6. A system for detecting ruptures in a pipeline as in claim 5, wherein:
said second logic means comprises memory means coupled to said fluid pressure responsive means for storing an output signal thereof for a predetermined interval; and,
comparator means coupled to said memory means and to said fluid pressure responsive means for comparing said stored signal with another output signal from said fluid pressure responsive means.

7. A system for detecting ruptures in a pipeline as in claim 5, wherein:
said first memory means includes
a memory circuit; and,
sampling means coupled to said memory circuit and to said fluid flow responsive means for clearing and reloading said memory circuit and for transferring said stored signal from said first memory means to said comparator means at a predetermined time interval.

8. A system for detecting ruptures in a pipeline as in claim 5, wherein:
said second memory means includes
a memory circuit; and,
sampling means coupled to said memory circuit and to said fluid pressure responsive means for clearing and reloading said memory circuit and for transferring said stored signal from said second memory means to said comparator means at a predetermined time interval.

* * * * *